Nov. 19, 1957    P. W. EMLEY ET AL    2,814,009
SPEED CONTROL APPARATUS FOR INDUCTION MOTORS
Filed Oct. 7, 1954    2 Sheets-Sheet 1

Inventors.
Philip W. Emley
Clyde F. Robbins
By H R Rather
Attorney

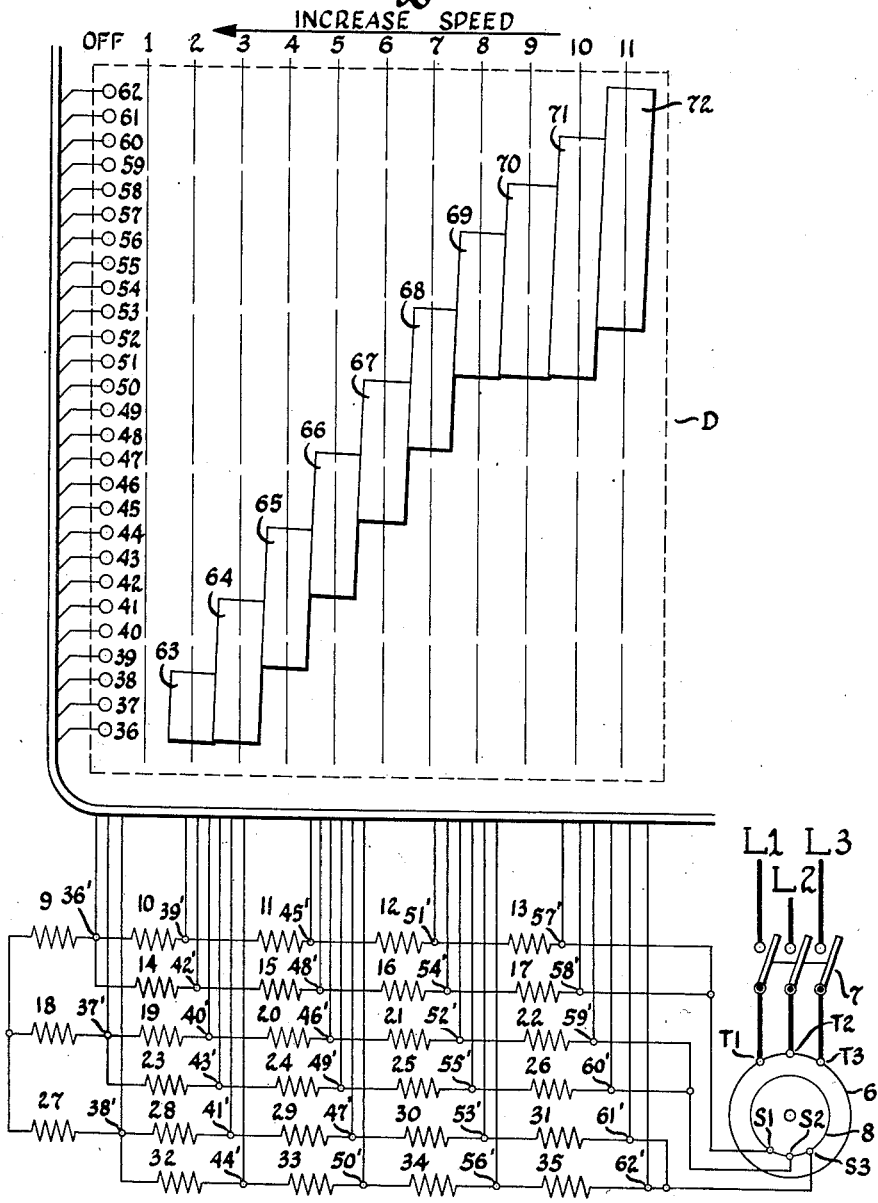

United States Patent Office 2,814,009
Patented Nov. 19, 1957

2,814,009

SPEED CONTROL APPARATUS FOR INDUCTION MOTORS

Philip W. Emley, Okauchee, and Clyde F. Robbins, Milwaukee, Wis., assignors to Cutler-Hammer, Inc., Milwaukee, Wis., a corporation of Delaware Application October 7, 1954, Serial No. 460,992

5 Claims. (Cl. 318—238)

This invention relates to speed control apparatus for induction motors, and more particularly to control apparatus of the drum type.

In the use of drum controllers for commutating secondary resistance networks for motors of higher ratings than the contact fingers of such controllers are normally built to withstand, connection of parallel pairs of contact fingers to each tap of the resistance network has been used in an endeavor to cut-down the current each contact finger is required to carry. This arrangement requires a considerable number of contact fingers and wiring for a relatively few speed points. It has also been found that such parallel contacts rarely divide the current equally, one or the other carrying all the load on make or arc rupture, as the case may be, due to inability to effect contact make or break with both fingers simultaneously.

It is an object of the present invention to provide an improved secondary resistance network and commutating sequences therefor which are particularly suited to drum type controllers, which afford considerably more possible speed points for the same number of contact fingers as compared with the system hereinbefore mentioned, and which inherently avoid the current division problems of such systems.

Another object is to provide an improvement in drum segment mounting whereby operation of the drum is made easier and more positive with respect to actual star-wheel positions.

The accompanying drawings illustrate preferred embodiments of the invention which will now be described in detail, it being understood that the embodiments illustrated are susceptible of modification without departing from the scope of the appended claims.

In the drawings:

Fig. 3 is a schematic showing of the use of a control drum in connection with a preferred form of secondary resistance network for a polyphase induction motor.

Figure 1:
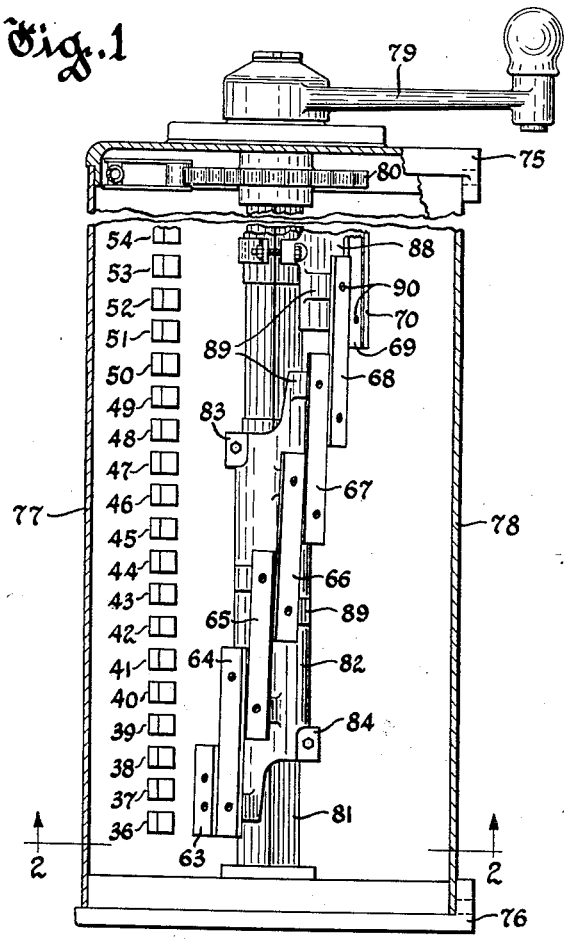
Figure 1 is a view in side elevation of a control drum constructed in accordance with the invention, the drum casing being shown in section, and certain parts of the contact fingers being omitted for simplicity of illustration.

Referring to Fig. 3, the numeral 6 designates a polyphase induction motor, having stator terminals T1, T2 and T3 adapted to be connected to polyphase supply lines L1, L2 and L3, upon closure of contacts of a switch 7, which may be of any preferred type. Motor 6 has a rotor, generally designated 8, which has winding slip ring terminals S1, S2 and S3. Each slip ring terminal is connected to a series-parallel phase group of resistors, and the three groups are connected in star relation. Thus the group having connection with slip ring S1, includes the series connected branch of resistors 9 through 13, and a series connected branch of resistors 14 through 17 that are connected in parallel with resistors 10 through 13 of the first mentioned branch. Slip ring S2 has connected thereto a series connected branch of resistors 18 through 22, and a second series connected branch of resistors 23 through 26, which are connected in parallel with resistors 19 through 22. Slip ring S3 has connected thereto a series branch of resistors 27 through 31, and has a second series branch of resistors 32 through 35 which are connected in parallel with resistors 28 through 31.

The control drum is provided with a multiplicity of contact fingers 36 through 62, which are respectively connected to taps 36' through 62', in the connections between the various resistors 9 through 35 as shown in Fig. 3, and is also provided with a multiplicity of bridging segments 63 through 72. The development of the drum is designated by the reference character D and includes eleven operating positions which is one more than the number of bridging segments. The first operating position does not effect any commutation of secondary resistance, and may be assumed to be provided for controlling the primary motor circuits in a manner not shown. When the drum is moved to the second operating position segment 63 bridges finger 36, 37 and 38 to short circuit secondary resistors 9, 18 and 27. Upon operation of the drum to the third operating position segment 64 bridges the last mentioned fingers and additionally bridges fingers 39, 40 and 41 to short circuit secondary resistors 10, 19 and 28. In the fourth operating position segment 65 continues the bridge across fingers 39, 40 and 41 and additionally bridges fingers 42, 43 and 44. In as much as resistors 10, 14, 19, 23, 28 and 32 are all short circuited in the fourth operating position, fingers 36, 37 and 38 are disengaged.

During movement to the fifth operating position segment 66 bridges the then bridged contacts 42, 43 and 44 and additionally bridges contacts 45, 46 and 47 to short circuit resistor 11, 20 and 29. Previously bridged fingers 39, 40 and 41 are disengaged in the fifth operating position. In the sixth operating position segment 67 bridges the then bridged fingers 45, 46 and 47 and additionally bridges fingers 48, 49 and 50 to short circuit resistors 15, 24 and 33. Previously bridged fingers 42, 43 and 44 are disengaged in the sixth operating position.

It will be observed that the same pattern of short circuiting secondary resistors continues through operation of the control drum to the eighth operating position, wherein all but resistors 13, 17, 22, 26, 31 and 35 will then be short circuited. In the ninth operating position, segment 70, in addition to continuing the bridge of previously bridged fingers 51 through 56, bridges finger 57 and 58 to short circuit resistors 13 and 17. Upon operation of the drum to the tenth operating position segment 71 bridges the previously bridged fingers 51 through 58 and in addition bridges fingers 59 and 60. Operation of the drum to the eleventh operating position causes segment 72 to bridge the previously bridged segments 53 through 60 and to additionally bridge fingers 61 and 62 to short circuit resistors 31 and 35. Fingers 51 and 52 previously bridged by segments 69, 70 and 71 in the eighth, ninth and tenth operating positions are disengaged in the eleventh operating positions.

From the foregoing it will be apparent that balanced secondary resistance is afforded in each of the second through eighth and eleventh operating positions, and that unbalanced secondary resistance is afforded in the ninth and tenth operating positions.

Figure 2:
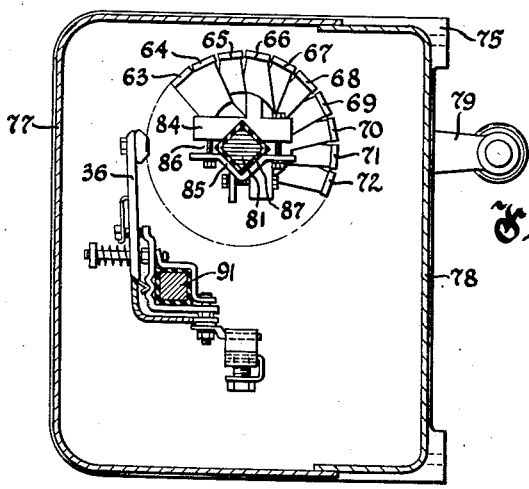
Fig. 2 is a sectional view taken along the line 2—2 of Fig. 1.

The mechanical features of the drum are best shown in Figs. 1 and 2. It includes a casing comprising top and bottom cast metal sections 75 and 76 of known form and front and rear sheet metal sections 77 and 78. The drum is provided with an operating handle 79, and any well known form of pressed roller and star-wheel device, such as that indicated at 80.

Attached to the handle 79 and afforded rotational bearing support in the upper and lower sections 75 and 76 is a shaft 81, the intermediate portion of which is of rectangular or other desired polygonal cross section. A segment supporting member 82 is attached to the lower portion of shaft 81 through the medium of upper and lower clamping lug portions 83 and 84 which are found to accommodate the angular corners of the shaft, clamping plates 85 which are opposed to the lugs 83 and 84, and suitable bolts and nuts, one set of which is shown at 86. Interposed between shaft 81 and the aforementioned clamping lugs and plates is a layer of laminated insulating material 87 whereby member 82 is suitably insulated from shaft 81. Another such segment supporting member 88, which is fragmentarily shown in Fig. 1, is similarly mounted on shaft 81 above member 82 with its clamping lugs and associated plates and fasteners disposed at a rotary angle of 90° with respect to the corresponding parts of member 82.

Each of the members 82 and 88 has a plurality of integrally formed, radially extending lug or boss portions 89 which have substantially flat outer faces to which the bridging segments 63 to 72 are attached. The bridging segments which are preferably formed from flat, rectangular metal strips and beveled on their longitudinal edge, are each secured to pairs of such lugs 89 which are spaced apart slightly helically with respect to the axis of shaft 81. Segment 68 is supported adjacent its lower end on a lug 89 on member 82 and adjacent its upper end on a lug 89 on member 88. The segments are secured to the lugs by bevel head screws 90 which penetrate receiving openings in the sections and take into tapped recesses in the lugs.

The form of the contact finger 36 and supporting means therefor is shown in detail in Fig. 2 it being understood that the other contact fingers 37 through 54 are of like form and are attached in like manner to and insulated from a stationary shaft 91. The form of the contact fingers and supporting means therefor are shown and described in the Barnum Patent No. 1,245,551 and hence further description thereof is deemed unnecessary.

The aforedescribed mounting of the bridging segments affords a slight amount of skewing of their longitudinal edges with respect to the axis of shaft 81 and the contact tips of each of the contact fingers. Such alinement of the segments lessens the torque required to cause the contact fingers to ride up on a bridging segment as fingers to be newly bridged are engaged progressively rather than simultaneously. For example, if as viewed in Fig. 2, shaft 81 is rotated in the counterclockwise direction segment 63 will engage with finger 36 slightly in advance of its engagement with finger 37, and this will be true for every lower numbered finger with respect to a higher numbered finger engaged by the same segment. This slight stagger in engagement of contact fingers requires less torque to drive the operating shaft 81 between its operating positions, and also minimizes the chances of false star-wheel position indication to the operator which occur when a multiplicity of fingers ride-up on a bridging segment simultaneously. Moreover, resistors of the associated secondary network are accordingly successively commutated during change of the controller from one operating position to another, thereby affording decrease in current in-rush increments to the motor primary during acceleration.

Other patterns of commutating the resistors of the resistance network branches besides those shown and described in connection with Fig. 3 are possible and practical. For example, resistors 13, 17, 22, 26, 31 and 35, by addition of more bridging segments and star-wheel operating positions can be arranged to short circuit such resistors individually in six successive operating positions in the sequence 13, 22, 31, 17, 26 and 35, in which event two additional unbalanced and one additional balanced speed point would be obtained. Moreover, it is to be understood that the secondary resistance network of the present invention is not to be limited to any particular number of parallel branches in each phase group on any particular number of resistors included therein.

We claim:

1. The combination with an induction motor having a polyphase rotor, of a resistance network having phase groups connected in star relation and to the respective rotor terminals, said phase groups each including at least two parallel branches of series connected resistors, taps between the various resistors of each phase group, and a drum controller comprising a multiplicity of contact fingers respectively connected to said taps and further comprising a multiplicity of segments to be brought into bridging engagement with associated contact fingers in a predetermined manner to short circuit simultaneously corresponding resistors in certain of said branches in a predetermined relation.

2. The combination according to claim 1 wherein segments are so arranged that in successive operating positions of the controller corresponding resistors in corresponding branches of each phase group are simultaneously short circuited in one operating position and corresponding resistors in other corresponding branches of each phase group are simultaneously short circuited in a succeeding operating position.

3. The combination according to claim 1 wherein segments are so arranged that in successive operating positions of the controller corresponding resistors in all branches of one phase group are simultaneously short circuited in one operating position and corresponding resistors in all branches of another phase group are simultaneously short circuited in a succeeding operating position.

4. The combination according to claim 1 wherein segments are so arranged that corresponding resistors in corresponding branches of each phase group are individually short circuited in successive operating positions, their corresponding resistors in second corresponding branches are individually short circuited in a following succession of operating positions and so on until the corresponding resistors in all branches of all phase groups are short circuited.

5. For controlling the speed of an induction motor having a polyphase rotor, in combination, a resistance network having phase groups connected in star and having individual ends for connection to the respective rotor terminals of the motor, said phase groups each including at least two parallel branches of like numbers of series connected resistors, taps between the various resistors of each phase group, and a drum controller comprising a multiplicity of contact fingers respectively connected to said taps and further comprising a multiplicity of segments to be brought into bridging engagement with said contact fingers, certain of said segments being so arranged that in successive operating positions of the controller corresponding resistors in corresponding branches of all phase groups are simultaneously short circuited in one operating position and corresponding resistors in other corresponding branches of all phase groups are short circuited in a second operating position, and other of said segments being so arranged that in another succession of operating positions of the controller corresponding resistors in all branches of one phase group are simultaneously short circuited in a third operating position and corresponding resistors in all branches of another phase group are simultaneously short circuited in a fourth operating position.

References Cited in the file of this patent

UNITED STATES PATENTS

| | | |
|---|---|---|
| 1,425,640 | Gazda | Aug. 15, 1922 |
| 1,773,830 | Walker | Aug. 26, 1930 |
| 1,817,244 | Fox | Aug. 4, 1931 |
| 1,994,821 | Hunter | Mar. 9, 1935 |
| 2,672,579 | Jochem | Mar. 16, 1954 |